United States Patent
Harrysson et al.

(10) Patent No.: US 12,388,732 B2
(45) Date of Patent: Aug. 12, 2025

(54) HISTORIC NETFLOW ANALYSIS SYSTEM AND METHOD

(71) Applicant: NTT SECURITY HOLDINGS CORPORATION, Tokyo (JP)

(72) Inventors: Mattias Harrysson, Tokyo (JP); Yasuyuki Hamada, Tokyo (JP)

(73) Assignee: NTT Security Holdings Corporation, Tokyo (JP)

(*) Notice: Subject to any disclaimer, the term of this patent is extended or adjusted under 35 U.S.C. 154(b) by 66 days.

(21) Appl. No.: 18/243,967

(22) Filed: Sep. 8, 2023

(65) Prior Publication Data

US 2025/0088440 A1    Mar. 13, 2025

(51) Int. Cl.
*H04L 43/062* (2022.01)
*H04L 43/026* (2022.01)
*H04L 43/067* (2022.01)

(52) U.S. Cl.
CPC .......... *H04L 43/062* (2013.01); *H04L 43/067* (2013.01)

(58) Field of Classification Search
CPC .... H04L 43/062; H04L 43/067; H04L 43/026
See application file for complete search history.

(56) References Cited

U.S. PATENT DOCUMENTS

| | | | |
|---|---|---|---|
| 6,575,902 B1 | 6/2003 | Burton | |
| 7,225,343 B1 | 5/2007 | Honig et al. | |
| 7,912,698 B2 | 3/2011 | Statnikov et al. | |
| 8,135,718 B1 | 3/2012 | Das et al. | |
| 8,402,543 B1 | 3/2013 | Ranjan et al. | |
| 8,510,830 B2 | 8/2013 | Reilly | |
| 8,762,298 B1 | 6/2014 | Ranjan | |
| 9,144,389 B2 | 9/2015 | Srinivasan et al. | |
| 9,183,387 B1 | 11/2015 | Altman et al. | |
| 9,674,298 B1 * | 6/2017 | Edwards | H04L 67/5682 |
| 9,674,880 B1 | 6/2017 | Egner et al. | |
| 9,769,189 B2 | 9/2017 | Mohalsen et al. | |
| 9,781,160 B1 * | 10/2017 | Irimie | H04L 63/1483 |
| 9,787,640 B1 | 10/2017 | Xie et al. | |
| 10,566,084 B2 | 2/2020 | Kataoka | |
| 10,742,669 B2 * | 8/2020 | Takahashi | H04L 63/0236 |
| 2003/0137109 A1 | 7/2003 | Vancura | |
| 2004/0128535 A1 | 7/2004 | Cheng | |
| 2006/0187060 A1 | 8/2006 | Colby | |
| 2006/0189377 A1 | 8/2006 | Gomez et al. | |
| 2007/0256141 A1 | 11/2007 | Nakano et al. | |

(Continued)

FOREIGN PATENT DOCUMENTS

| | | |
|---|---|---|
| JP | 2003242124 A | 8/2003 |
| JP | 2007318745 A | 12/2007 |

(Continued)

OTHER PUBLICATIONS

Website Traffic, Statistics and Analytics @ ALEXA—Webpage: https://www.alexa.com/siteinfo retrieved from internet Jan. 30, 2018, 5 pages.

(Continued)

*Primary Examiner* — Kamal M Hossain
(74) *Attorney, Agent, or Firm* — Manatt, Phelps & Phillips, LLP

(57) ABSTRACT

A system and method perform historic netflow searching for an IP address, such as an IPv4 address, in a cost, time and storage efficient manner using blob indexes and bitsets.

16 Claims, 12 Drawing Sheets

(56) References Cited

U.S. PATENT DOCUMENTS

| | | |
|---|---|---|
| 2007/0298874 A1 | 12/2007 | Baerlocher |
| 2007/0298875 A1 | 12/2007 | Baerlocher |
| 2008/0076515 A1 | 3/2008 | Baeriocher et al. |
| 2009/0066521 A1 | 3/2009 | Atlas et al. |
| 2009/0280891 A1 | 11/2009 | Filipour et al. |
| 2009/0319457 A1 | 12/2009 | Cheng et al. |
| 2010/0066509 A1 | 3/2010 | Okuizaimi et al. |
| 2010/0286572 A1 | 11/2010 | Moersdorf et al. |
| 2011/0118011 A1 | 5/2011 | Filipour |
| 2012/0005755 A1 | 1/2012 | Kitazawa et al. |
| 2013/0074186 A1 | 3/2013 | Muttik |
| 2013/0195326 A1 | 8/2013 | Bear |
| 2014/0153478 A1 | 6/2014 | Kazmi et al. |
| 2015/0088791 A1 | 3/2015 | Lin et al. |
| 2017/0063893 A1 | 3/2017 | Franc et al. |
| 2017/0092068 A1 | 3/2017 | Vann |
| 2017/0251005 A1 | 8/2017 | Niv |
| 2017/0318033 A1 | 11/2017 | Holland et al. |
| 2017/0337776 A1 | 11/2017 | Herring |
| 2018/0047253 A1 | 2/2018 | Vann |
| 2018/0069885 A1 | 3/2018 | Patterson |
| 2018/0082530 A1 | 3/2018 | Upton et al. |
| 2018/0082533 A1 | 3/2018 | Hallerbach et al. |
| 2018/0083988 A1 | 3/2018 | Kataoka et al. |
| 2018/0329958 A1 | 11/2018 | Choudhury |
| 2019/0132342 A1 | 5/2019 | Arlitt et al. |
| 2019/0305957 A1 | 10/2019 | Reddy et al. |

FOREIGN PATENT DOCUMENTS

| | | |
|---|---|---|
| JP | 2008049602 A | 3/2018 |
| JP | 2018148267 A | 9/2018 |
| WO | WO2008117544 A | 10/2008 |
| WO | WO2012075336 A1 | 6/2012 |
| WO | WO2018140335 A1 | 8/2018 |
| WO | WO2019032745 A1 | 2/2019 |

OTHER PUBLICATIONS

Kegelman, J.C., et al., entitled "Insights into vehicle trajectories at the handling limits:analyzing open data from racecar drivers; Taylor & Francis, Vellicle System Dynamics" dated Nov. 3, 2016, 18 pages.

Theodosis et al., "Nonlinear Optimization of a Racing Line for an Autonomous Racecar Using Professional Driving Techniques", dated Oct. 2012, 7 pages, Citation and abstract, Theodosis retrieved from the web at: https://www.researchgate.net/publication/267650184.

Tulabandhula, T. et al. "Tire Changes, Fresh Air, and Yellow Flags: Challenges in Predictive Analytics for Professional Racing" MIT, dated Jun. 2014 (17 pages.).

Takagahara, K. et al.: "hitoe"—A Wearable Sensor Developed through Crossindustrial Collaboration, NTT Technical Review, dated Sep. 4, 2014 (5 pages.).

Lee, J.H., et al., Development of a novel Tympanic temperature monitoring system for GT car racing athletes—Abstract Only—pp. 2062-2065, dated 2013, (3 pages.), Lee retrieved from the web at https://link.springer.com/chapter/10. 1007 /978-3-642-29305-4_541.

Kataoka et al., "Mining Muscle Use Data for Fatigue Reduction in IndyCar," MIT Sloan Sports Analytics Conference (Mar. 4, 2017), pp. 1-12., Kataoka retrieved from the Internet. http://www.sloansportsconference.com/wp-content/uploads/2017/02/1622.pdf.

Malik et al. "Automatic training data cleaning for text classification." In: 2011 IEEE 11th international conference on data mining workshops. Dated : Dec. 11, 2011, Malik retrieved on Feb. 22, 2022, entire document, http://www.cs.columbia.edu/~hhm2104/papers/atdc.pdf.

Chawla et al., "SMOTE: synthetic minority over-sampling technique." In: Journal of artificial intelligence research. Dated: Jun. 2, 2002, 37 pages, Chawla retrieved on Feb. 22, 2022 at https://patents.google.com/patent/US 10887324B2/en.

Yen et al., "Cluster-based under—sampling approaches for imbalanced data distributions." In: Expert Systems with Applications. Dated: Apr. 2009, 10 pages, Yen retrieved at: https://sci2s.ugr.es/keel/pdf/specific/articulo/yen_cluster_2009.pdf.

Analytics Vidhya. "Imbalanced Data: How to handle Imbalanced Classification Problems in machine learning?" In: Dated: Mar. 17, 2017, 17 pages., retrieved at: https://www.analyticsvidhya.com/blog/2017/03/imbalanced-data-classification/.

Fullmer, et al., "The OSU flow-tools Package and Cisco Netflow Logs", 2000 Lisa XIV—Dec. 3-8, 2000—New Orleans, LA, pp. 291-304.

Fusco, et al., "Real-time creation of bitmap indexes on streaming network data" The VLDB Journal (2012) 21:287-307.

* cited by examiner

| Start time | Duration | Source IP address | Source port number | Destination IP address | Destination port number | Number of packets | Size of packets in total (in Bytes) |
|---|---|---|---|---|---|---|---|
| 2019-1-31 00:00:00 | 0.001 second | xxx.23.23.23 | 80 | yyy.33.44.55 | 8080 | 3 | 87 |

FIGURE 1

```
$ zcat nfacctd-2dr44-netflow-20210921-1607.ipv4.gz
1.0.0.0
1.0.0.1
1.0.0.2
1.0.0.3
1.0.74.249
1.0.79.231
1.0.81.217
1.0.84.114
1.0.88.78
1.0.90.20
```

FIGURE 7 year=2021 / month=08 / ipv4.bitset.gz
year=2021 / month=08 / day=01 / ipv4.bitset.gz
year=2021 / month=08 / day=01 / hour=00 / ipv4.bitset.gz
year=2021 / month=08 / day=01 / hour=00 / minute=00 / nfacctd-n8429-netflow-20210801-0000.ipv4.gz
...

FIGURE 9

- Check 1, does 1.2.3.4 occur in "year=2023/month=01/ipv4.bitset.gz"?
  - Yes=Continue, No=Exit, no more month to search since time range only spans January
- Check 2, does 1.2.3.4 occur in "year=2023/month=01/day=01/ipv4.bitset.gz"?
  - Yes=Continue, No=Continue to next day as we should check days 1 to 25 (assuming Check 1 found something)
- Check 3, does 1.2.3.4 occur in "year=2023/month=01/day=01/hour=00/ipv4.bitset.gz"?
  - Yes=Continue, No=Continue to next hour as we should check hours 0 to 23 (assuming Check 2 found something for this day or if time range includes the hours)
- Check 4, does 1.2.3.4 occur in "year=2023/month=01/day=01/hour=00/minute=00/nfacctd-n8429-netflow-20220101-0000.ipv4.gz"?
  - Yes=Send "year=2021/month=01/day=01/hour=00/minute=00/nfacctd-n8429-netflow-20230101-0000.csv.gz" to queue, No=Nothing more to process for this "branch", but more blobs could be found in other "branches"

FIGURE 11

HISTORIC NETFLOW ANALYSIS SYSTEM AND METHOD

FIELD

The disclosure relates to a system and method for analyzing historical netflow and in particular to a system and method for efficiently finding a requested IP address in historical netflows.

BACKGROUND

A known technique to analyze computer network traffic is to use a known network flow data (netflow data). An example of netflow data is shown in FIG. 1. The example shows information about a data flow between two computer nodes (a source node at the xxx.23.23.23 IP address and a destination node at the yyy.33.44.55 IP address). The netflow data may also include a start time, a duration, source and destination port numbers, a number of packets and size of the packets in the data flow. This data can be used to perform various analysis of the data traffic on a computer network, such as malware detection, botnet detection and the like.

In addition to analyzing current netflow data, it is possible to analyze historical netflow data to perform the same various analysis of the data traffic on a computer network. One significant problem is that the historical netflow data may involve millions of netflows. Netflows for a particular time period may each be stored in a data blob and a single netflow data blob for a short time interval (less than a second) may include about seven million netflows. Thus, if a user wants to analyze historical netflow data during a month, the storage of a month's worth of netflow data would be enormous and the computational power needed to search that historical month of netflow data would be excessively cost prohibitive. While searching through each historic netflow data blob is possible, it is very time consuming and costly and not realistic for time ranges spanning several months due to the volume of the netflow data.

It is desirable to be able to reduce the amount of data that must be searched in historic netflow data so that the analysis of the historical netflow data is easier to perform, is less costly and less time consuming. The disclosed historic netflow analysis system and method overcomes these problems with historic netflow analysis and it is to this end that the disclosure is directed.

BRIEF DESCRIPTION OF THE DRAWINGS

FIG. 1 is an example of netflow data;

FIG. 7 illustrates an example of a blob index file;

FIG. 9 illustrates a search method for historic netflows using an IPv4 bitset

FIG. 11 illustrates further details of the search method for historic bitsets.

DETAILED DESCRIPTION OF ONE OR MORE EMBODIMENTS

The disclosure is particularly applicable to an IPv4 address protocol based historical netflow analysis system and method and it is in this context that the disclosure will be described. It will be appreciated, however, that the system and method has greater utility since it may be used with netflow data for computer network addresses that use other address protocols.

The historic netflow analysis system may reduce processing unnecessary data when searching in the historical netflows by generating and using a blob index file for each new netflow blob wherein each blob index file may be stored in a blob data storage. The blob index file (discussed below in more detail) for each blob is a summary of a complete set of unique IP addresses in that blob. Furthermore, the historic netflow analysis system may reduce processing unnecessary data by generating and using an bitsets at different time ranges (per month, per day, per hour, etc.) that further granularize the historic netflow data and thus avoid even more unnecessary data processing when analyzing historic netflow data.

The historic netflow determining system and method may be used in conjunction with any system that uses well known netflows to assess computer related traffic. For example, the historic netflow determining system and method may be used for malware detection using netflows as disclosed in U.S. Pat. No. 10,742,660 and/or may be used for forming graphs from netflows as disclosed in U.S. Pat. No. 11,252,185 directed to graph streaming, all of which are owned by the same assignee as this patent application and all of which are incorporated herein by reference and form part of the specification.

Figure 2:
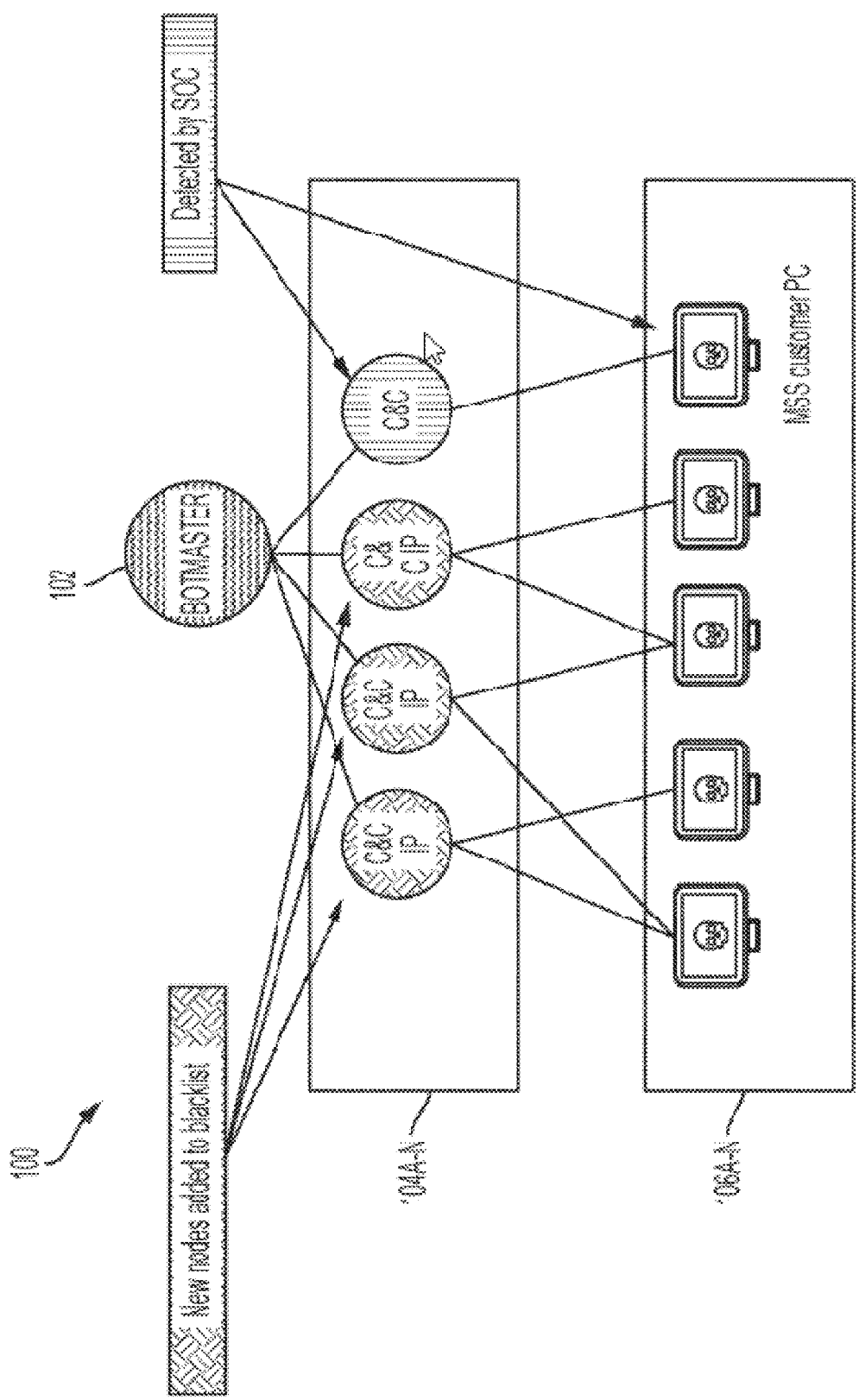
FIG. 2 illustrates an example of botnet detection that may be performed using historical netflow.

FIG. 2 illustrates a botnet detection process 100 that may use the historic netflow analysis techniques discussed below. In the example in FIG. 2, one or more botnet(s) may be used for well-known Trickbot malware. The botnets may consist of victims 106A-N, command & controller servers (or C&C server) 104A-N, and a botmaster 102. The victims 106A-N are computers that are infected by the Trickbot malware. For example, a victim can be a computer used by an employee of a bank and infected by malware attached to an impersonated e-mail message. The victim steals and sends, for example, customers' account numbers and passwords to the criminals behind the botnets. The C&C servers 104A-N are computers that control victims by sending commands. Botmasters 102 are the computers that control the C&C servers 104A-N. In computer security, it is desirable to be able to detect each or preferably all of the computers (and their IP addresses) that are part of the botnet in order to eliminate or reduce the threat of that botnet, such as the Trickbot mentioned above. The below disclosed historic netflow data analysis system and method allows historic netflow data over a predetermined period of time (a day, a month, several months, etc.) to be used to detect the botnet in an efficient manner.

Figure 3:
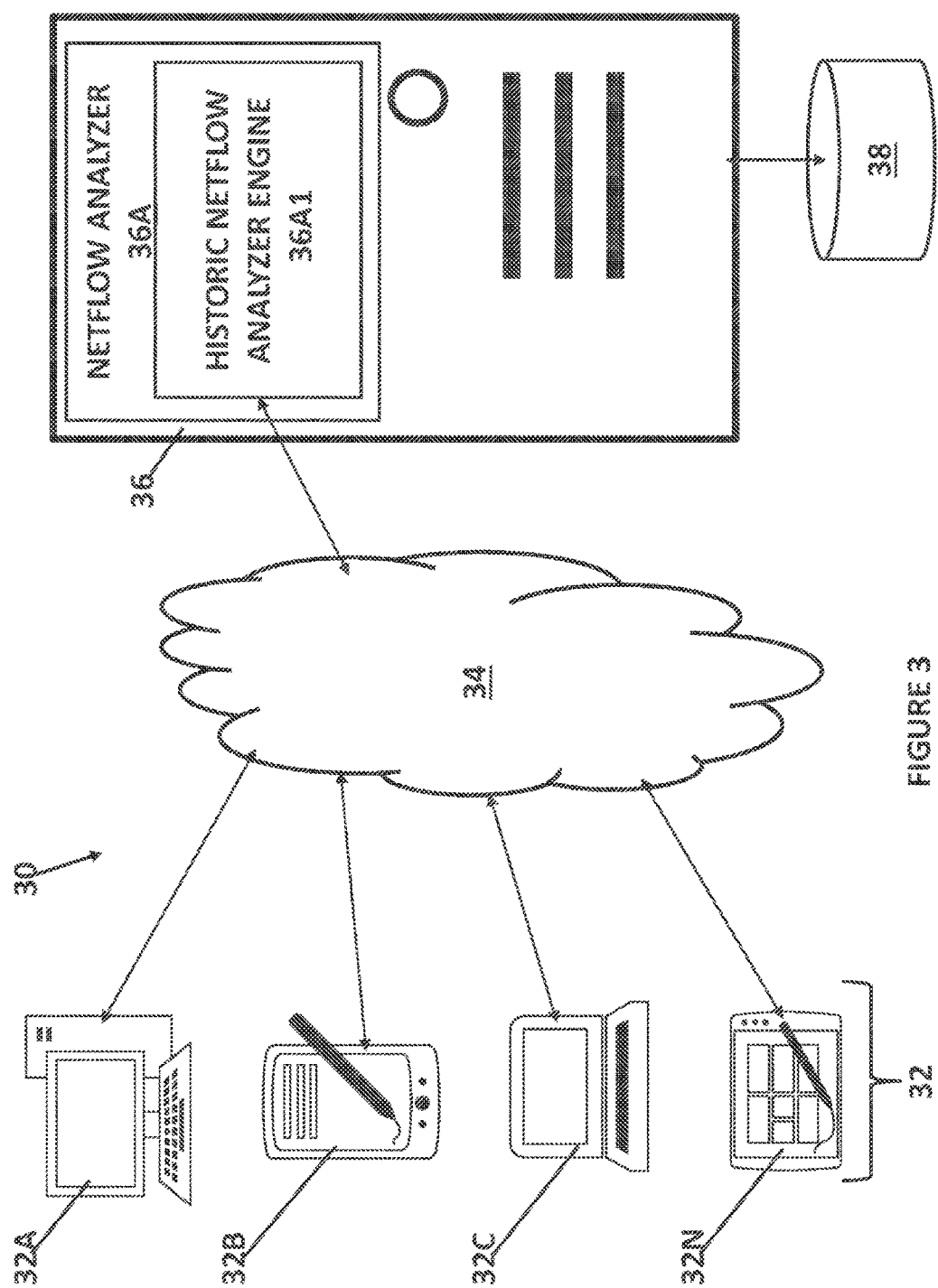
FIG. 3 is an example of a system architecture for a historic netflow analysis system.

FIG. 3 is an example of a system architecture for a historic netflow analysis system 30 that allows an efficient search for historic netflows while reducing storage requirements and increasing processing speed. The system 30 in FIG. 3 may be a tool used internally, a service provided to users (shown in the example in FIG. 3) or a third party that interfaces with other systems that use netflows for various computer network analyses. In the example in FIG. 3, the system 30 may have one or more computing devices 32 that may each request historic netflow searching services from the system 30 and then consume the output of the requested services (directly or via an API). In some cases, each computing device 32 may connect to and communicate over a communication path 34 with a backend system 36 that is also connected to a store 38. Each computing device may have a processor, memory, a display and communication circuits (WiFi, cellular, Bluetooth, Ethernet, etc.). For example, each computing device 32 may be a personal computer 32A, a smartphone device 32B (such as an Apple® iPhone® or Android® operating system based device), a laptop computer 32C, and/or a tablet computer 32N. Each computing device 32 may have a known browser application that is executed by the computing device 32 to interact with the backend system 36.

The communication path 34 may be a wired or wireless network (or a combination of both) that use data and communication protocols for the connection and communication of each computing device 32 with the backend system 36. Each piece (or the entire communication path) may be wired (ethernet, DSL, cable, etc.) or wireless (digital computer network, cellular data network, WiFi, LAN, WAN, etc.). The system 30 in FIG. 3 can operate with any communication path.

The backend 36 may be implemented using one or more computing resources, such as cloud computing resources including server computers, blade servers, processors, memory, virtual machines, etc., server computers with a processor and a memory, etc. and the processor of the backend 36 executes a plurality of lines of instructions/computer code so that the processor is configured to perform the various operations of a netflow analyzer 36A. The netflow analyzer may have a historic netflow analyzer engine 36A1 (also implemented by executing a plurality of lines of instructions/computer code on a processor of the backend 36) that processes historic netflows to generate blob index files and bitsets and make it easier to perform a search of the historic netflows that is less cumbersome, requires less storage and can be performed more quickly using technical elements than known techniques to analyze historic netflows. The backend 36 may be coupled to one or more stores 38 (hardware or software or a combination) that store the plurality of historic netflow blobs, the blob indexes, the IPv4 bitsets and the results of the search requested by each user via a browser and/or the API.

Figure 4:
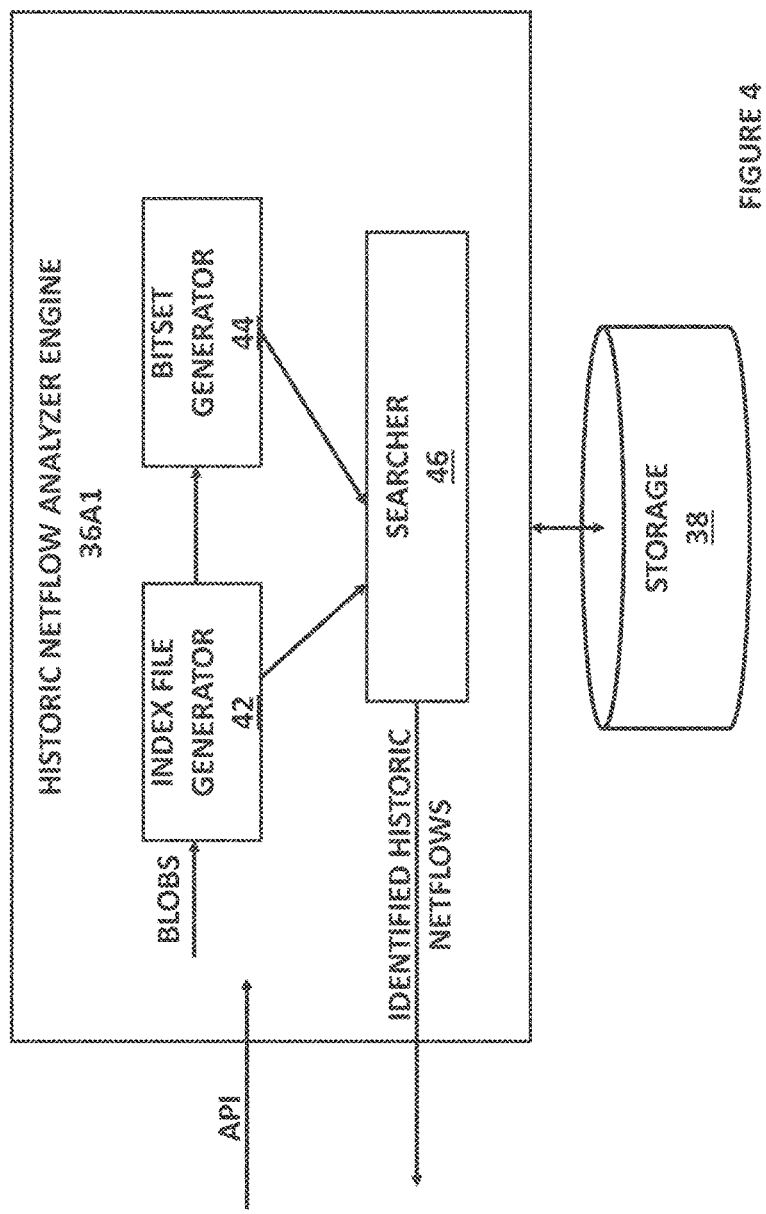
FIG. 4 illustrates more details of the historic netflow analysis system backend of FIG. 3.

FIG. 4 illustrates more details of the historic netflow analysis system backend 36A1 of FIG. 3 in which a user can submit a new historic netflow request via a browser interface and/or the API of the backend 36. The historic netflow analysis system backend 36A1 may have an index file generator 42, a bitset generator 44 and a searcher 46 that are coupled to each other to generate an output that is one or more identified historic netflows based on the netflow blobs stored in the store 38, the generated index files and generated bitsets of the system and the requested IP address from the user. Each element of the historic netflow analysis system backend 36A1 may be implemented by a plurality of lines of instructions/computer code executed by a processor of the backend system 36. The details of the blob index files and the bitsets are described below. Each of the blob index files and the bitsets are technical features of the system that reduce the volume of data that has to be searched to perform the historic netflow search thus reducing the storage needs and time to perform the historic netflow searching. In general, the one or more blob index files may be generated from one or more netflow blobs and the one or more bitsets may be generated based on the blob files and the blob index files.

Figure 5:
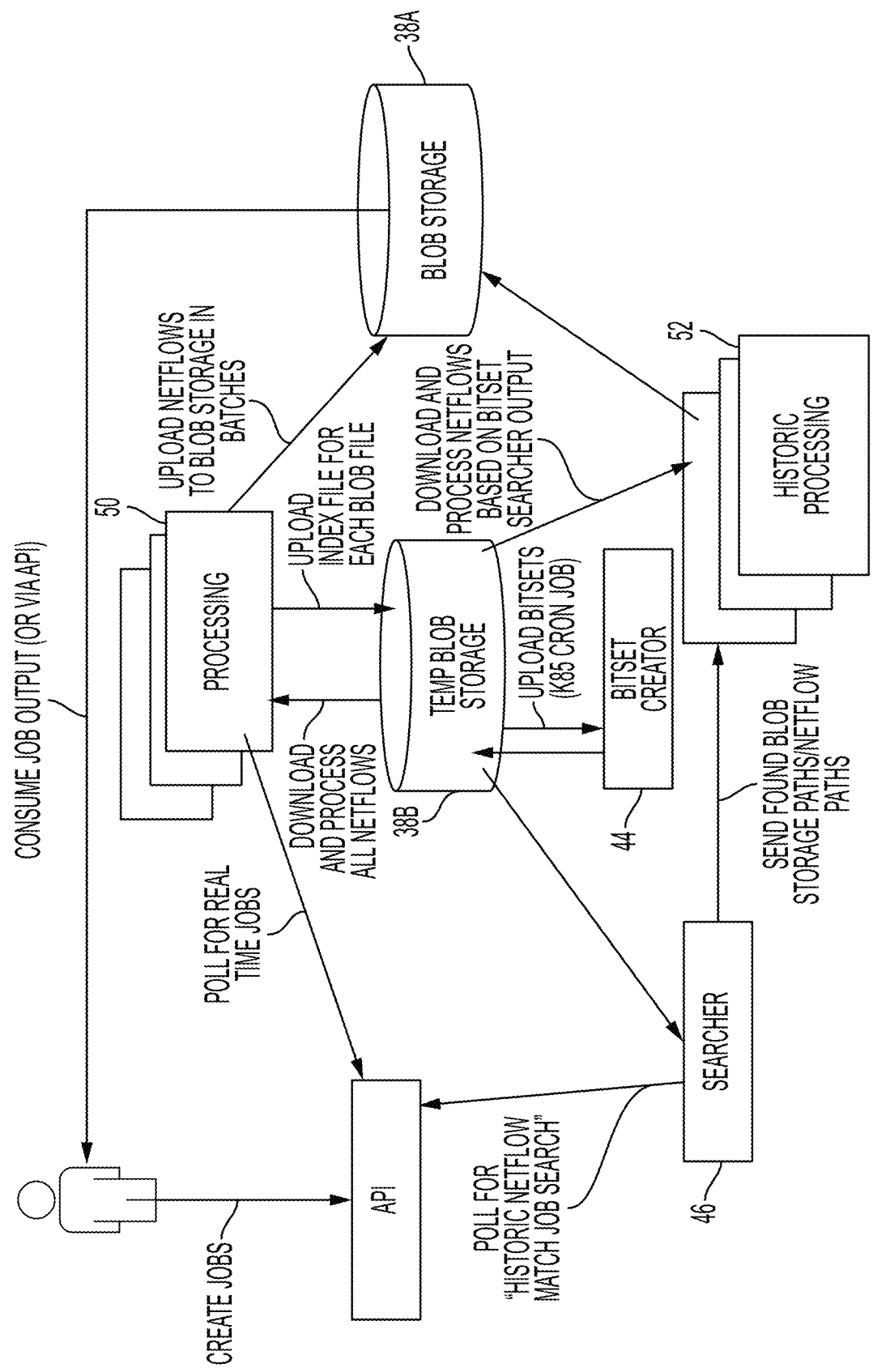
FIG. 5 illustrates an exemplary implementation of the historic netflow analysis system backend.

FIG. 5 illustrates an exemplary implementation of the historic netflow analysis system backend in which a user of the system creates a new job (a search for a particular IPv4 address, such as 1.2.3.4, during a period of time, such as between Jan. 1, 2023 and Jan. 25, 2023 using a set of historic netflows that may have different time periods as discussed below) that is submitted, such as via an application programming interface (API), to the system. The user may also consume the output of the job (via API or web interface) that is generated by the system wherein the output may be historic netflows that contain the searched for IP address. In this implementation, the system may have a temporary blob storage 38B and a blob storage 38A. The temporary blob storage 38B may be used to store data while a job is being processed and may store netflow blob files used during the particular processing, blob index files for each blob file and bitsets for the netflow blobs. In one implementation, each blob storage may be Azure blob storage. The found netflows having the requested IP address may be stored in the blob storage 38A so that it can be output to the user who requested the historic netflow search.

The processing element 50 may poll for new jobs, download and process all of the stored netflows in the temporary blob store 38B and upload blob index files for each blob file to the temporary blob storage 38B. The processing 50 may also upload netflows to blob storage 38A in batches. The bitset creator 44 may retrieve the blob index files and and generate one or more bitsets and the generated one or more bitsets are stored in the temporary blob storage 38B. The searcher 46 may poll for historic netflow searches, retrieve the blob indexes and bitsets from the temporary storage 38B to perform the historic netflow search and send found netflows to the historic processing 52. The historic processor 52 may retrieve and process found netflows based on the bitset and searcher output and output the netflows that contain the request IP address.

Figure 6:
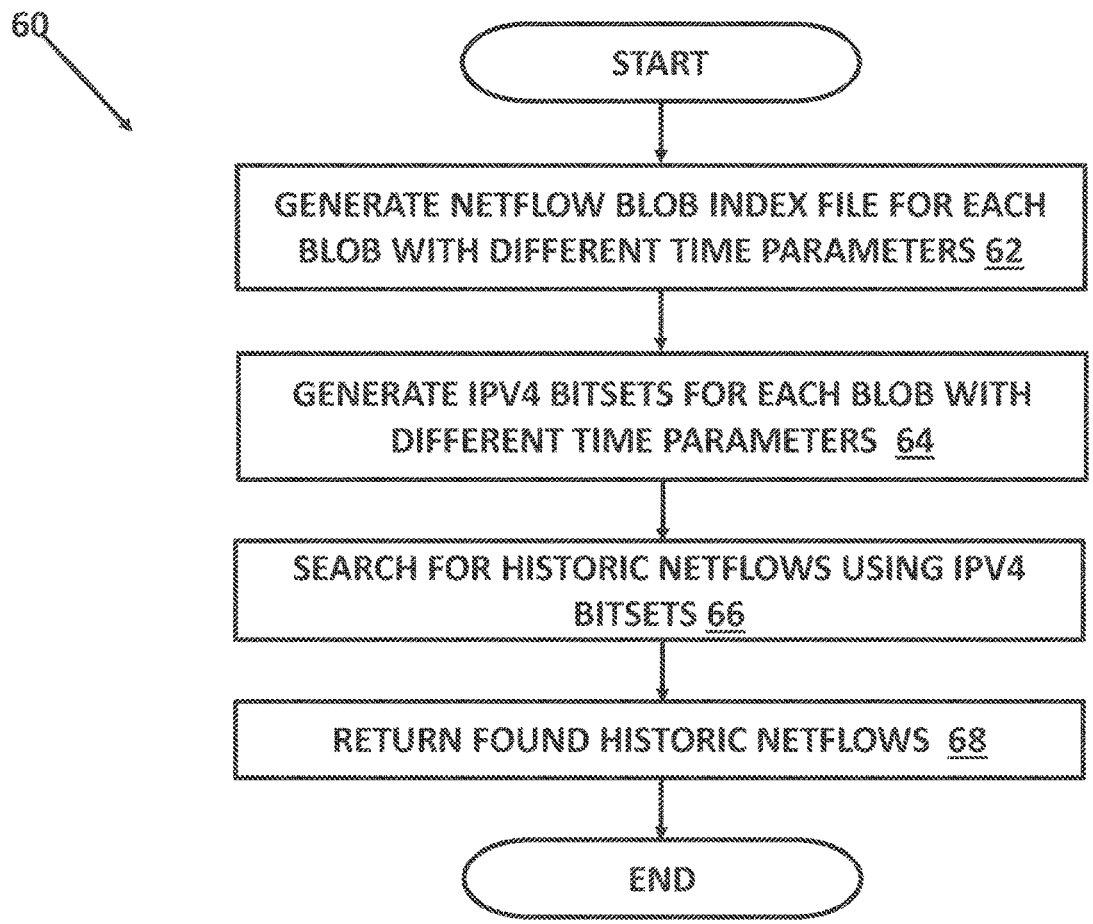
FIG. 6 illustrates a method for finding historic netflows.

FIG. 6 illustrates a method 60 for finding historic netflows. The method 60 may be performed using the system shown in FIGS. 3-5 or other known or yet to be developed systems that are capable of performing the processes of the method shown in FIG. 6. The method may process all netflow blobs (having possible different time intervals) uploaded to the blob (that may for example, by exemplified by *.csv.gz) and, for each netflow blob, the method may generate and upload (62) a new "blob index file" (*.ipv4.gz, for example) containing all unique IPv4 addresses for that blob. An example of a blob index file is shown in FIG. 7 wherein each IPv4 address is on a separate line in the index file. The blob index file for each netflow blob is typically between 5 and 10 MB compressed and thus further removal of unnecessary data is needed to permit the rapid search for historic netflows without enormous storage demands. This reduction of the unnecessary data occurs due to the bitsets that are generated by the method (64) for each blob wherein each blob has different time intervals of netflow data.

IPv4 addresses are typically represented in dot decimal notation string, but can be converted to decimal so that, for example, "5.5.5.5" (the dot decimal notation) becomes 84215045 (decimal notation). Between ["0.0.0.0", "255.255.255.255"] we have 256×256'256×256 ($2^{32}$) possible values. A bitset with $2^{32}$ bits can be represented with 67,108,864 64 bit words (~537 MB). As a result, a compact "lookup table" may be created using IPv4 decimals as bit indices and the lookup table byte size is constant regardless of set or unset bits. Storing the bitset compressed in the blob storage reduces its storage size resulting in around 85% reduced size for hourly bitsets and around 50% reduced size for monthly bitsets with gzip.

Figure 8:
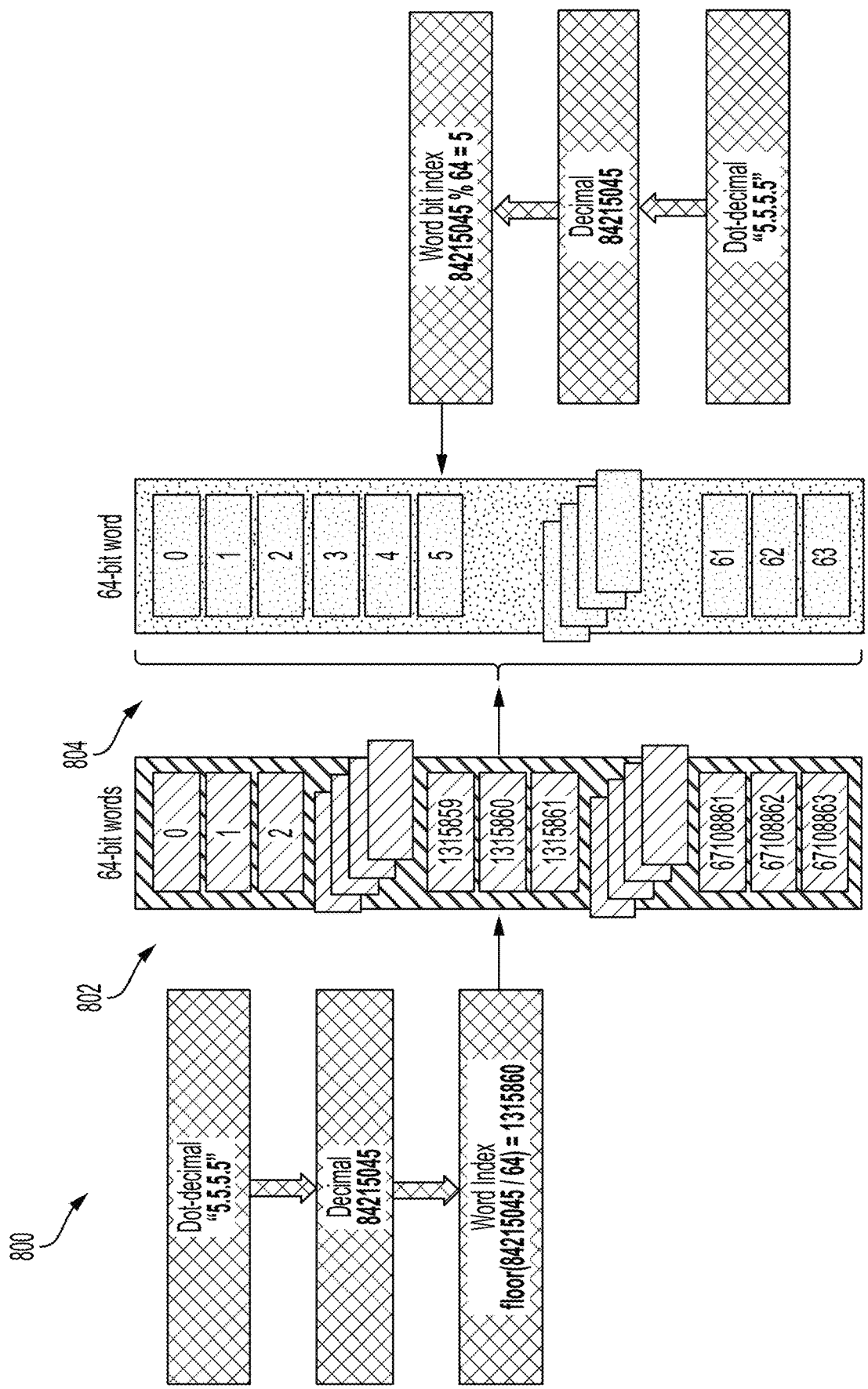
FIG. 8 illustrates a method for generate an IPv4 bitset.

FIG. 8 illustrates a method 800 to generate an IPv4 bitset in which an example of the IPv4 address 5.5.5.5 (decimal 84215045) is converted into a bit in the bitset to generate the bitset that may be used to search historic netflows. As shown in FIG. 8, the decimal IPv4 address is converted into a word index for a set of 64 bit words 802. In one implementation, the decimal IPv4 address is divided by 64 and then rounded down (floor math function (to the nearest integer to find the correct 64-bit word. In the example in FIG. 8, the correct 64 bit word is 1315860. The correct 64 bit word may be mapped to a 64 bit word index 804 to find the correct bit within the 64 bit word 804 bitset. This is a "bit operation". It can either set or get the bit which represents one IPv4 address.

For example, to cover the IPv4 address "5.5.5.5" into decimal form, the IPv4 address is split into four segments: 5, 5, 5, and 5. Then, each segment is converted into an integer. In this example, each segment remains the same since each is already represented as integers. Bit shifting and addition may be performed in which: the first segment, 5, is left-shifted by 24 bits: 5<<24=83886080; the second segment, 5, is left-shifted by 16 bits: 5<<16=327680; the third segment, 5, is left-shifted by 8 bits: 5<<8=1280; and the fourth segment, 5, remains the same. The results of the bit shifts may be added together to obtain the final decimal number (in the example, 83886080+327680+1280+5=84215045) so that the IPv4 address "5.5.5.5" corresponds to the decimal number 84215045.

The system may be limited by a 64-bit CPU for the bit operation and thus needs to fetch a 64-bit word from the bitset. The index of the bitset can be computed in which the decimal form of 5.5.5.5 is used to compute the word index floor (84215045/64)=1315860. The bitset generation then may perform a bit operation on the 64-bit word extracted with the word index floor. For the bitset, it is desirable to know which bit to look at in the 64-bit word (there are 64 bits) and that may be computed as follows 84215045% 64=5 for the example above. To check if the bit representing "5.5.5.5" (84215045) is in the bitset, the method obtains the 64-bit word on position 1315860 in the bitset and do the actual bitwise operation on this 64-bit word to determine if bit on position 5 is set e.g. "64bitword>>5 & 1==1" and if true, the bit is set, false otherwise. This operation may be represented in pseudocode as: (words [floor (84215045/ 64)]>>(84215045% 64)) & 1==1.

Once the bitsets are generated, the method may generate various bitsets for the netflow blobs. The method may generate bitsets for various time periods for the netflow blobs as shown in FIG. 9. For example, a job may be run hourly that summarizes all *.ipv4.gz blob index files into a bitset for that hour, a job that runs daily and summarizes all hourly bitsets into a bitset for that day, a job that runs monthly and summarizes all daily bitsets into a bitset for that month and so on for different time intervals.

Returning to FIG. 6, once the bitsets for the different time intervals are generated, the method may search the historic netflows (66) for the particular IPv4 address using the generated bitsets. This searching process is discussed below in more detail with reference to FIGS. 10-11. The results of the search are returned to the user as found historic netflows (68).

Figure 10:
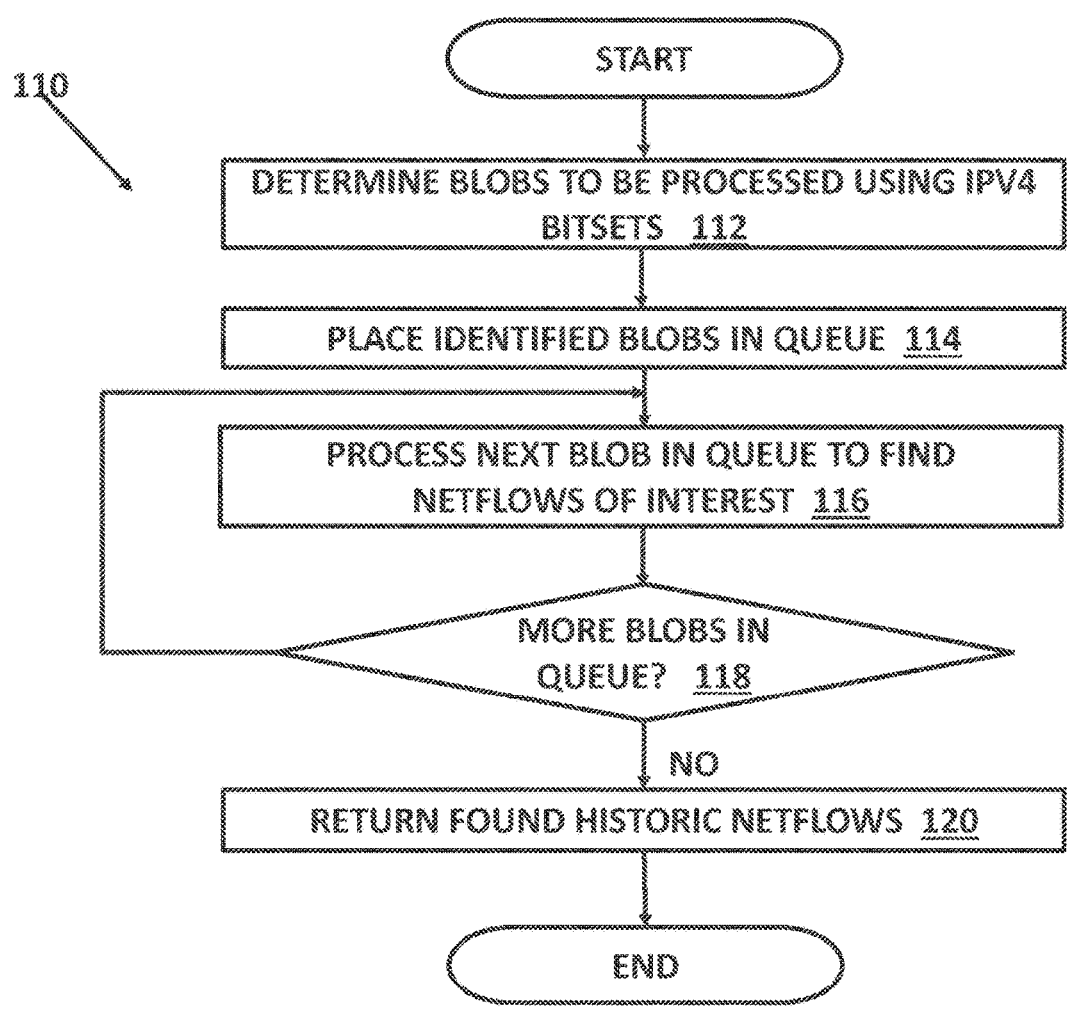
FIG. 10 illustrates an alternative method for finding historic netflows using the implementation shown in FIG. 5.

For example, if the user wants to find (and submits a job in one example) certain IPv4 netflows within a time range, two processes for searching may be performed as part of the searching process 110 shown in FIG. 10. In a first process, a search process (that may be implemented by the searcher 46 in FIG. 5) searches for bitsets and index files within the time range to find relevant netflow blobs that should be processed (112).

The details of this processing are shown in FIG. 11. In a simple example used to illustration purposes, a user is searching for IPv4 address 1.2.3.4 between 2023 Jan. 1 and 2023 Jan. 25. In this simple example, the IPv4 address 1.2.3.4 is found in minute 00, hour 0 (midnight) of Jan. 1, 2023 to make the example simpler, but one skilled in the art would understand that the process would find the requested IPv4 address on Jan. 4, 2023 at 11 AM at the $40^{th}$ minute, etc. using the processes described below.

Figure 12:
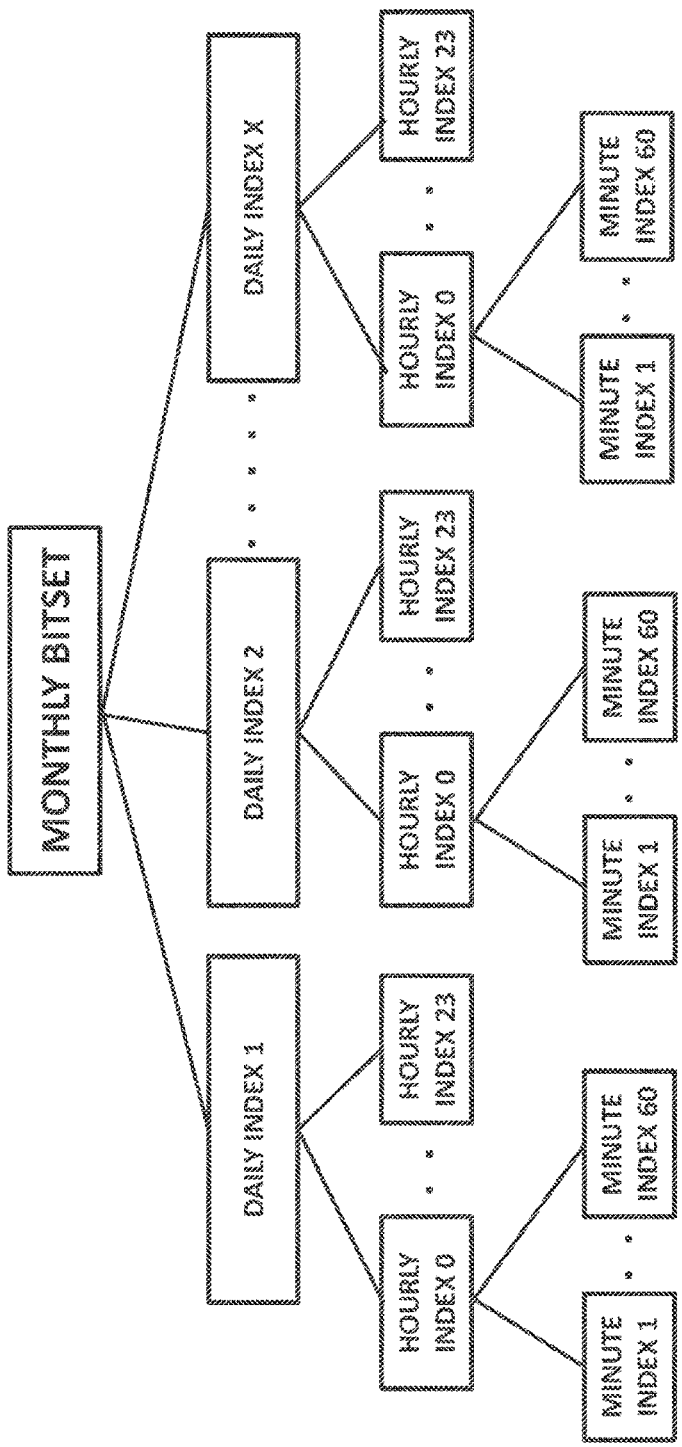
FIG. 12 illustrates a tree structure used to search the historic netflows.

The bitsets and index files for that time period may be thought of as a "tree" (see FIG. 12) where the root is the monthly bitset and the leaves are the index files. During this search, the process may perform one or more checks (with four checks in this simple example) at different levels of time period granularity based on different levels of the tree. For example, in the simple example, the first check is at a month level granularity, the second check is at a day level, the third check is at a hourly level and a fourth check is at a minute time period level. Alternatively, the month level granularity may be a longest time interval bitset for this example, the day level granularity may be a short time interval and the minute level of granularity may be a shortest time interval. During the search, each branch of the tree may be quickly searched or discarded at a high level of granularity. For example, if the daily index for the $2^{nd}$ day of the month is searched and the requested address is not found, then the rest of that branch does not need to be searched thus reducing the time required to complete the search.

In the simple example, the first check may be to determine whether the IPv4 address 1.2.3.4 occurs in "year=2023/ month=01/ipv4.bitset.gz" which is a netflow blob for the netflows during January 2023 since January 2023, in the simple example, is the largest period of time that needs to be searched in the efficient manner using the blob index files and the bitsets. If the IPv4 address 1.2.3.4 is found in that netflow blob, then the next check is performed. If the IPv4 address 1.2.3.4 is not found in the monthly netflow blob (based on the blob index files and bitsets), then the search is complete and no more searching is needed since, in this example, the request time range of the search only spans January 2023. This searching processing of starting with the largest time period means that, if the IPv4 address is not found in the largest time period netflow blob, the process is completed as compared to other processes.

If the check of the monthly network blob (using the blob index files and the bitset) indicates that the desired IPv4 address is in the monthly netflow blob, the searching process may perform a second check of whether the address 1.2.3.4 occurs in "year=2023/month=01/day=01/ipv4.bitset.gz" which is a network blob covering netflows during Jan. 1, 2023 (a narrower period of time than the month of January). If the IPv4 address 1.2.3.4 is found in that netflow blob, then the next check is performed. If the IPv4 address 1.2.3.4 is not found in the daily netflow blob (based on the blob index files and bitsets), then the search must perform checks for days 2 to 25 in January 2023 since those days are within the time period of the request. Like the check for day #1, days 2-25 are performed in the similar manner using netflow blob index files and bitsets for those days.

If the check for at least one of the days (1-25) in January finds the address, the third check determines whether the address 1.2.3.4 occurs in "year=2023/month=01/day=01/hour=00/ipv4.bitset.gz" which is a network blob covering netflows during Jan. 1, 2023 and midnight (00) (a narrower period of time than the month of January or the days in January). If the IPv4 address 1.2.3.4 is found in that netflow blob, then the next check is performed. If the IPv4 address 1.2.3.4 is not found in the hourly netflow blob for midnight (based on the blob index files and bitsets), then the search must perform checks for each of the other hours (1 to 23 representing 1 AM or 11 PM) during the day in January 2023 in which the requested address was found. Like the check for hour #0, hours 1-23 are performed in the similar manner using netflow blob index files and bitsets for those hours of the particular day.

If the check for at least one hour of the day in January finds the address, the fourth check determines whether the address 1.2.3.4 occurs in "year=2023/month=01/day=01/hour=00/minute=00/nfacctd n8429 netflow 20220101 0000.ipv4.gz" which is a network blob covering netflows during Jan. 1, 2023 at midnight (00) at 0 minutes (a narrower period of time than the month of January or the days in January or midnight on January 1). If the IPv4 address 1.2.3.4 is found in that minute netflow blob, then that network blob is added to a queue. If the IPv4 address 1.2.3.4 is not found in the minute netflow blob (based on the blob index files and bitsets), there are no more network blobs to process in this branch of the tree, but more blobs may be found in other "branches." Thus, the search process traverses the tree of bitsets and index files (See FIG. 12 for a simple example) to search for the historic netflows in a time and storage efficient manner.

Using the search, the "Best" case scenario is finding no IPv4 address match within time range using the monthly bitset. That search would complete in less than a minute. Searching through each netflow file for that month would take considerable time, money and processing power to walk through. The "Worst" case scenario is finding a IPv4 address match in every index file within a time range which would be the same as searching without the bitsets and index files. But if this was always true (which it is not), the benefit of the searcher is still finding the correct blobs to process for a given time range.

For more complicated searches (search over a longer time period with more bitset and index files), the number of checks performed during the search will be larger in order to funnel/filter down from a check of the longest time period index and bitset files in which the desired IPv4 address can exist through one or more increasingly granular checks to a check for the shortest time period index and bitset files for the IPv4 address.

Returning to FIG. 10, the method places each netflow blob that contains the requested address into a queue (114) with a "poison pill" at the end to mark that the search is completed for this netflow blob. The method then performs the historic netflow determining (such as using the historic processors 52 in FIG. 5 in one implementation) in which the historic processing processes a next blob in the queue (116), such as by consuming netflow blob names from the queue, retrieving the particular netflow blob and reads the netflow blob to find the flows in which the IPv4 of interest occurs. The process of historic processing can start as soon as the first netflow blob name is put on the queue. The process of searching for the netflow blobs is typically much, much faster to complete than the historic netflow processing that will need most of the processing power (depending on how many blob files are found). The method may determine if there are more blobs in the queue (118) and loop back to the processing process 116 if there are more netflow blobs. If there are not any more netflow blobs to process, the method generates a summary of the netflow blobs that contain the IPv4 address and returns those results to a user (120).

The searching (by the searcher 46 in the FIG. 5 implementation) starts differently depending on the time range of the requested search for the IPv4 address. Specifically, if the time range is one or more months, the searching may start searching through the "monthly bitsets" as was done in the simple example above. However, if the time range for the request is just a few hours, the searching would start by searching through the "hourly bitsets" since the month and day that contains the IPv4 address is not part of the search and already known by the requestor of the search.

Technical Advantages Provided by Disclosed System and Method

Using the known techniques, the netflows could be stored in the database, such as common SQL or NoSQL database. In these known techniques, the method for finding historic netflows would mean there would not be "searching" (the novel combination of blob index files and bitsets) but rather "look up" flows immediately (e.g. give me all flows within this time range) which would be storage intensive and processor computation intensive. An alternative known technique would be to only store lookup details for the IP address and the netflow blobs in which the IP address is present. For example, for the amount of netflow volume contained in the historical netflows, the known techniques would probably only store the IPv4 address→[blobs] information which would only find the blobs of interest given the search parameters (IP+time range). The same amount of processing would still need to be done for the disclosed system and method, but the costs of storing the "index" information and retrieving the "index" information would be a significant differentiator.

Database have a cost associated to keep it running (excluding storage cost) whereas cloud blob storage is only storage cost. The disclosed bitsets and blob index data can be stored in different tiers (hot, cold and archive) with substantial different cost depending on tier of the cloud storage whereas the database (used for most known techniques) typically is always "hot" on a disk such as an SSD. Furthermore, the disclosed bitset/index data can be stored compressed, but would not be searchable using the known techniques.

The biggest advantage is storage costs and storage volume. There are typically multiple netflow blobs, such as five, each minute and there are between 6-8 million flows per netflow blob. A typical netflow blob may have about 3 million unique IP addresses. To store this information in a database would require around 3 million new entries/associations (one for each unique IP address) pointing towards this single blob or around 15 million new entries for the five blobs in that single minute. It quickly grows out of proportions even when looking at storing this for days, let alone months. Thus, the disclosed technique provides a technical solution to be able to efficiently store and search historic netflows that would be infeasible and/or expensive using known techniques.

The foregoing description, for purpose of explanation, has been with reference to specific embodiments. However, the illustrative discussions above are not intended to be exhaustive or to limit the disclosure to the precise forms disclosed.

Many modifications and variations are possible in view of the above teachings. The embodiments were chosen and described to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers,. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method for finding a historic netflow having a particular IP address, the method comprising:
    retrieving, by a historic netflow computer system, a plurality of netflow blobs each containing a plurality of netflows wherein each netflow contains data about data traffic between an internet protocol (IP) address of a source host and the IP address of a destination host during a certain period of time in the past, each of the plurality of netflow blobs containing the plurality of netflows over a different period of time in the past;
    receiving, by the historic netflow computer system, a request to find a requested IP address during a searchable period of time, wherein the requested IP address is findable in at least two of the network blobs that have netflows over different periods of time in the past;
    generating, by the historic netflow computer system, a blob index file for each of the at least two netflow blobs, each blob index file containing each of a plurality of IP addresses in the netflow blob for a different period of time in the past;
    generating, by the historic netflow computer system, a bitset for one of the at least two netflow blobs having a longest time period, wherein the bitset contains a set of bits in a word wherein each IP address of the plurality of IP addresses in the netflow blob having the longest period of time is converted into a bit in the bitset, wherein each bit in the bitset corresponds to the actual IP address;
    performing, by the historic netflow computer system, a search, using the bitset and the at least two blob index files, to find a historic netflow having the requested IP address in a netflow during the searchable period of time; and
    displaying, on a display of a user computing device, the found historic netflow having the requested IP address.

2. The method of claim 1 further comprising forming a search tree having a root that is the generated bitset and a plurality of leaves wherein each leaf is one of the generated blob index files and wherein performing the search further comprises checking, in each blob index file, if the requested IP address appears in the blob index file.

3. The method of claim 2, wherein the performing the search further comprises identifying a particular netflow blob to be processed having the requested IP address using the blob index file corresponding to the particular netflow blob and one or more bitsets corresponding to the particular netflow blob and searching the identified particular netflow blob to find a historic netflow having the request IP address during a time interval of the particular netflow blob.

4. The method of claim 3 further comprising queuing the identified particular netflow blobs and finding the requested IP address in each identified particular netflow blob in the queue.

5. The method of claim 1, wherein the period of time is one of an hour, a month and a day.

6. The method of claim 1, wherein the generated bitset is a sixty-four bit word.

7. The method of claim 1 further comprising generating a plurality of bitsets wherein each generated bitset has a time period that varies between a shortest time interval, a short time interval and a longest time interval and wherein performing the search for the historic netflow further comprises performing the search using the generated bitset having the longest time interval, performing the search using the generated bitset having the short time interval if the requested IP address is contained in the longest time interval bitset and performing the search using the generated bitset having the shortest time interval if the requested IP address is contained in the short time interval bitset to find the historic netflow with the requested IP address.

8. The method of claim 1, wherein the requested IP address is an IPv4 IP address.

9. A system for finding a historic netflow having a particular IP address, the system comprising:
    a historic network finding computer system having a processor and a memory;
    a computing device of a user that is connectable to the historic network finding computer system;
    wherein the processor of the historic network finding computer system is configured to:
        retrieve a plurality of historic netflow blobs each containing a plurality of netflows wherein each netflow contains data about data traffic between an internet protocol (IP) address of a source host and the IP address of a destination host during a certain period of time in the past, each of the plurality of netflow blobs containing the plurality of netflows over a different period of time in the past;

receive a request to find a requested IP address during a searchable period of time, wherein the requested IP address is findable in at least two of the network blobs that have different periods of time in the past;

generate a blob index file for each of the at least two netflow blobs, each blob index file containing each of a plurality of IP addresses in the netflow blob for a different period of time in the past;

generate a bitset for one of the at least two netflow blobs having a longest time period, wherein the bitset contains a set of bits in a word wherein each IP address of the plurality of IP addresses in the netflow blob having the longest period of time is converted into a bit in the bitset, wherein each bit in the bitset corresponds to the actual IP address; and perform a search, using the bitset and the at least two blob index files, to find a historic netflow having the requested IP address in a netflow during the searchable period of time; and wherein a display of the computing device displays the found historic netflow having the requested IP address.

10. The system of claim 9, wherein the processor is further configured to form a search tree having a root that is the generated bitset and a plurality of leaves wherein each leaf is one of the generated blob index files and check, in each blob index file, if the requested IP address appears in the blob index file.

11. The system of claim 10, wherein the processor is further configured to identify a particular netflow blob to be processed having the requested IP address using the blob index file corresponding to the particular netflow blob and one or more bitsets corresponding to the particular netflow blob and search the identified particular netflow blob to find a historic netflow having the request IP address during a time interval of the particular netflow blob.

12. The system of claim 11, wherein the processor is further configured to queue the identified particular netflow blobs and find the requested IP address in each identified particular netflow blob in the queue.

13. The system of claim 9, wherein the period of time is one of an hour, a month and a day.

14. The system of claim 9, wherein the generated bitset is a sixty-four bit word.

15. The system of claim 9, wherein the processor is further configured to generate a plurality of bitsets wherein each generated bitset has a time period that varies between a shortest time interval, a short time interval and a longest time interval, perform the search for the requested IP address in the netflow blob using the generated bitset having the longest time interval, perform the search for the requested IP address in the netflow blob using the generated bitset having the short time interval if the requested IP address is contained in the longest time interval bitset and perform the search for the requested IP address in the netflow blob using the generated bitset having the shortest time interval if the requested IP address is contained in the short time interval bitset to find the historic network with the requested IP address.

16. The system of claim 9, wherein the requested IP address is an IPv4 IP address.

* * * * *